US012579153B2

(12) United States Patent
Rome

(10) Patent No.: US 12,579,153 B2
(45) Date of Patent: Mar. 17, 2026

(54) RANKING SEARCH RESULTS BASED ON QUERY-SPECIFIC SELECTION RESULTS

(71) Applicant: Comcast Cable Communications, LLC, Philadelphia, PA (US)

(72) Inventor: Scott Rome, Philadelphia, PA (US)

(73) Assignee: Comcast Cable Communications, LLC, Philadelphia, PA (US)

( * ) Notice: Subject to any disclaimer, the term of this patent is extended or adjusted under 35 U.S.C. 154(b) by 136 days.

(21) Appl. No.: 17/447,185

(22) Filed: Sep. 8, 2021

(65) Prior Publication Data

US 2023/0074298 A1 Mar. 9, 2023

(51) Int. Cl.
*G06F 16/20* (2019.01)
*G06F 16/2457* (2019.01)
*G06F 16/50* (2019.01)
*G06F 16/535* (2019.01)
*G06F 16/70* (2019.01)
*G06F 16/735* (2019.01)

(52) U.S. Cl.
CPC ...... *G06F 16/24578* (2019.01); *G06F 16/535* (2019.01); *G06F 16/735* (2019.01)

(58) Field of Classification Search
CPC ............. G06F 16/24578; G06F 16/535; G06F 16/735; G06F 16/24575
See application file for complete search history.

(56) References Cited

U.S. PATENT DOCUMENTS

2014/0201229 A1* 7/2014 Kirazci ............... G06F 16/3323
707/767
2019/0121824 A1* 4/2019 Checkley ............ G06F 17/3082
2019/0370393 A1* 12/2019 Finch ................. G06F 16/3338

* cited by examiner

*Primary Examiner* — Kristopher Andersen
(74) *Attorney, Agent, or Firm* — BakerHostetler

(57) ABSTRACT

Systems, methods, and apparatuses for query-specific ranking of search results are described herein. A first query may be received from a user device. A set of candidate results associated with the first query may be determined. The set of candidate results may be ranked based on inputting the set of candidate results in a machine learning model. The machine learning model may be trained using data indicating previously selected candidate results output in response to the first query and previously selected candidate results output in response to a second query. The second query may comprise the first query. Output, via the user device, of an indication of the ranked candidate results may be caused.

27 Claims, 11 Drawing Sheets

900

Receive, from a user device, a first query 902

Determine a set of candidate results associated with the first query 904

Rank, based on inputting the set of candidate results in a machine learning model, the set of candidate results, wherein the machine learning model is trained using data indicating previously selected candidate results output in response to the first query and previously selected candidate results output in response to a second query, wherein the second query comprises the first query 906

Cause output, via the user device, of an indication of the ranked candidate results 908

500

| ENTITY ID | QUERY | CLICKS |
|---|---|---|
| 501 | 502 | 503 |
| (a) Harry Potter | HA | 90 |
| (b) Hallmark Channel | HA | 100 |
| (c) A Star is Born | STA | 82 |
| (d) Stanley Tucci: Searching for Italy | STA | 100 |

504

| ENTITY ID 1 | ENTITY ID 2 | QUERY | |
|---|---|---|---|
| 505 | 506 | 507 | |
| Hallmark Channel | Harry Potter | HA | (a) |
| Stanley Tucci: Searching for Italy | A Star is Born | STA | (b) |

| | ENTITY ID 1 _602_ | ENTITY ID 2 _604_ | QUERY _606_ |
|---|---|---|---|
| (a) | Shrek | Shrek 2 | SHR |
| (b) | Wayne's World 2 | Wayne's World | WAY |
| (c) | Austin Powers | Austin Spurs | AUS |
| (d) | Lord of the Rings: Return of the King | Star Wars: Return of the Jedi | RETURN |

| | ENTITY ID | QUERY* | CLICKS |
|---|---|---|---|
| | | 702 | 704 |
| | 701 | | |
| (a) | Hallmark Channel | HA | 100 |
| (b) | Hallmark Channel | HAL | 200 |
| (c) | Harry Potter | HA | 90 |
| (d) | Harry Potter | HAR | 500 |

706

| ENTITY ID | QUERY | CLICKS* |
|---|---|---|
| Hallmark Channel | HA | 100 + 200 |
| Hallmark Channel | HAL | 200 |
| Harry Potter | HA | 90 + 500 |
| Harry Potter | HAR | 500 |

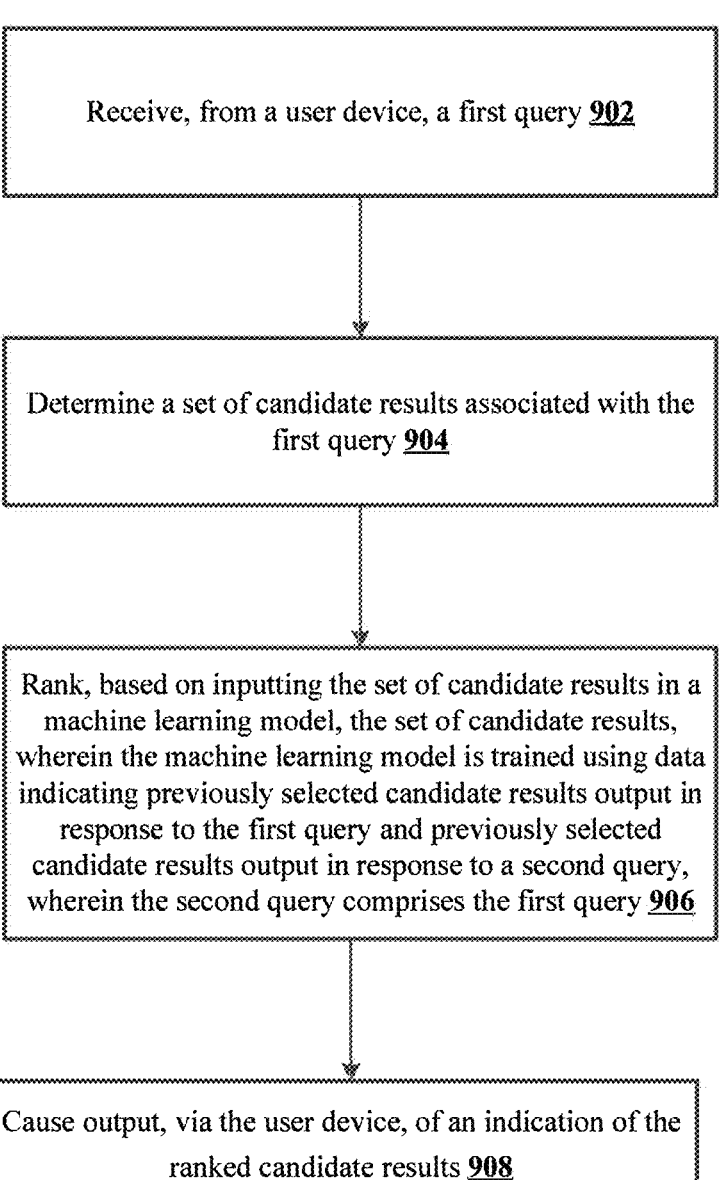

900

Receive, from a user device, a first query 902

Determine a set of candidate results associated with the first query 904

Rank, based on inputting the set of candidate results in a machine learning model, the set of candidate results, wherein the machine learning model is trained using data indicating previously selected candidate results output in response to the first query and previously selected candidate results output in response to a second query, wherein the second query comprises the first query 906

Cause output, via the user device, of an indication of the ranked candidate results 908

FIG. 9

1000

Train, based on a first query and first data indicating previously selected candidate results output in response to the first query, a machine learning model to rank candidate results for the first query 1002

Train, based on a second query that includes the first query and second data indicating previously selected candidate results output in response to a second query, the machine learning model to rank candidate results for the second query 1004

Further train the machine learning model to rank the candidate results for the first query based on the second data indicating previously selected candidate results output in response to a second query. 1006

FIG. 10

RANKING SEARCH RESULTS BASED ON QUERY-SPECIFIC SELECTION RESULTS

BACKGROUND

A user may want to output a particular video content item or may want to output content from a particular video content provider. However, it may be difficult or time-consuming for the user to locate that particular video content item or video content provider given the large quantity of existing video content items and video content providers (e.g., television channels, video content platforms, etc.) that the user must search through. As the quantity of video content items and video content providers continues to increase, there is an increasing need for improved searching techniques.

SUMMARY

Methods and systems for improved ranking of search results are described herein. A first query may be received from a user device. A set of candidate results associated with the first query may be determined. The set of candidate results may be ranked, based on inputting the set of candidate results into a machine learning model. The machine learning model may be trained using data indicating previously selected candidate results output in response to the first query and previously selected candidate results output in response to a second query that comprises the first query. Output of an indication of the ranked candidate results may be caused via the user device.

A machine learning model may be trained to rank candidate results for a first query based on the first query and first data indicating previously selected candidate results output in response to the first query. The machine learning model may additionally be trained to rank candidate results for a second query that includes the first query, based on the second query and second data indicating previously selected candidate results output in response to the second query. The machine learning model may be further trained to rank the candidate results for the first query based on the second data indicating previously selected candidate results output in response to the second query.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to features that solve any or all disadvantages noted in any part of this disclosure.

BRIEF DESCRIPTION OF THE DRAWINGS

The following detailed description is better understood when read in conjunction with the appended drawings. For the purposes of illustration, examples are shown in the drawings; however, the subject matter is not limited to specific elements and instrumentalities disclosed. In the drawings:

FIG. 5 shows an example set of entities being ranked based on query-specific selection results.

FIG. 6 shows an example set of entities ranked based on query-specific selection results.

FIG. 7 shows an example set of entities being ranked based on query-specific selection results.

FIG. 9 shows an example method for ranking search results based on query-specific selection results.

FIG. 10 shows an example method for ranking search results based on query-specific selection results.

DETAILED DESCRIPTION OF ILLUSTRATIVE EMBODIMENTS

Figure 1:
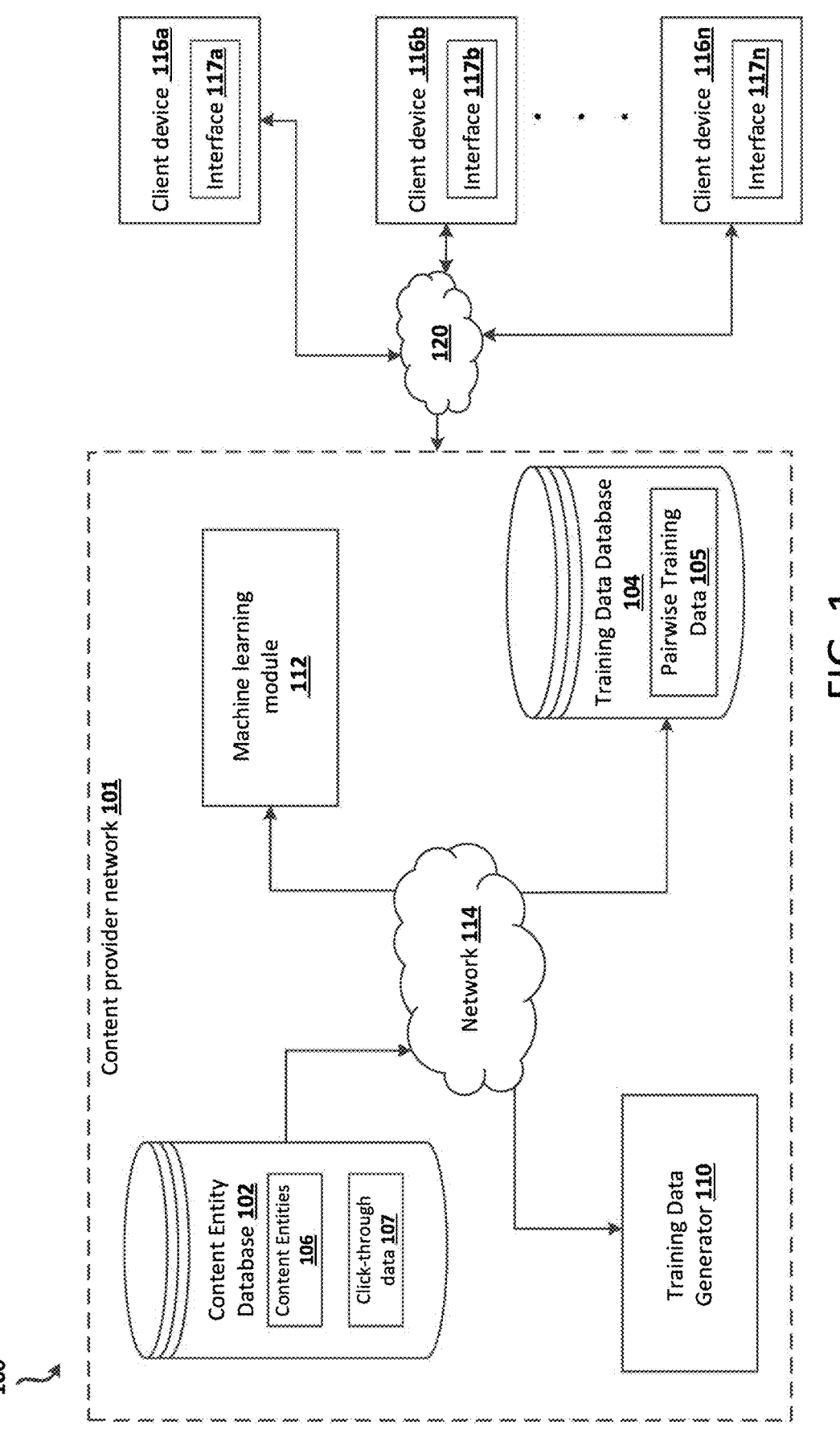
FIG. 1 shows an example system.

A user (e.g., consumer, client, etc.) may want to view a particular video content item or may want to view video content from a particular video content provider. To do so, the user may enter a query (e.g., one or more letters and/or words) associated with the desired video content item or video content provider on an interface of a user device. For example, the user may enter a query on an interface of a television, mobile device, smart television, tablet, laptop, computer, etc. The query may indicate at least a portion of the title of the video content item or the name of the video content provider. For example, the query may indicate one or more letters included in the title of the video content item or the name of the video content provider. For example, a user who wants to watch one of the Harry Potter movies may begin a search by entering the letter "H." Once the user enters the letter "H," and prior to the user completing a full search request, the letter "H" may be a first query and one or more content items can be determined as a search result and output to the user. If the user is not satisfied with the results associated with "H" or for any other reason, the user may continue to enter characters after "H" by next entering the letter "A," such that "HA" becomes a second query, and just as with the first query, one or more content items can be determined and output to the user. The user may continue to add letters (e.g., adding "R" to form a third query "HAR"), and for each additional letter added, one or more content items can be determined and output to a user. The user may decide at any point to review the search results for the desired Harry Potter title. The user may then select the desired Harry Potter title in the search results in order to output it.

After the user enters a query (e.g., enters "H" or enters "HA" or "HAR"), the user may be presented with one or more search results via the interface of the user device. The search result(s) may indicate those video content items having a title that includes the entered query. The search result(s) may additionally or alternatively indicate those video content providers having a name that includes the entered query. The search result(s) may be presented in the form of images on the interface of the user device. For example, each video content item having a title that includes the entered query and/or each video content provider having a name that includes the entered query may be associated with the image. The image associated with a video content item may be, for example, a frame taken from the video content item or a movie/television poster used to advertise the video content item. The image associated with a video content producer may be, for example, an image of a logo associated with the video content producer.

The search results may be ranked according to a global popularity. The global popularity ranking may indicate how popular each of the video content items and/or the video content providers have historically been. The popularity of a particular video content item and/or a particular video content provider may indicate how many times that video content item or video content provider has been selected for output in the past. Accordingly, the first ranked search result may be the video content item or video content producer that has been selected for output the greatest number of times in the past (as compared to the other items or providers in the search results). Likewise, the last ranked search result may be the video content item or video content producer that has been selected for output the fewest number of times in the past (as compared to the other items or providers in the search results).

The images associated with the search results may be presented on the interface of the user device in an order based on the global popularity ranking. For example, the image presented first on the interface of the user device may be associated with the video content item or video content provider that has been selected for output the greatest quantity of times in the past (as compared to the other search results). Likewise, the image presented last on the interface of the user device may be associated with the video content item or video content provider that has been selected for output the fewest quantity of times in the past (as compared to the other search results).

However, presenting the search results in an order based on global popularity may lead to a poor user experience. For example, the image presented first, second, third, etc. on the interface of the user device may not be associated with the video content item or video content provider that the user was actually looking for. As a result, the user may have to spend a large quantity of time scrolling through the search result images in order to find the desired video content item or video content provider. In some instances, the user may need to scroll through hundreds or thousands of search result images before finding the desired video content item or video content provider. The user may become frustrated, and in some instances, may give up before they even find the desired video content item or video content provider.

Accordingly, methods and systems are described for improved ranking of search results. The methods and systems described herein utilize a new query-specific ranking technique that employs machine learning to rank the search results based on prior click-through data associated with the query (i.e., query-specific selection results), rather than merely ranking search results based on global popularity. Prior click-through data may indicate, for each query, the content entities that have been selected the greatest number of times and the content entities that have been selected the fewest number of times. Additionally, or alternatively, prior click-through data may indicate, for each query, a quantity of times each content entity of a plurality of content entities has been selected for output. Ranking the search results based on past click-through data associated with a query may increase the probability that the first-ranked search result is the video content item or video content provider that the user was actually looking for when he or she entered the query. Accordingly, ranking the search results based on such query-specific selection results may increase the probability that the first search result image presented on the user interface is associated with the video content item or video content provider that the user was actually looking for.

As compared to a global popularity ranking (which ranks according to popularity, regardless of query), the query-specific ranking ranks the candidate search results according to query-specific selection results. In essence, the query-specific selection results provide a measure of query-specific popularity among the candidate search results. For example, the first-ranked search result associated with a particular query may be the video content item or video content provider that has been selected (e.g., "clicked on") for output the greatest number of times in the past when users entered that query (as compared to the other search results).

For example, the video content items "Two and Half Men" and "Harry Potter" may both be candidate search results for the query "HA," because the title of both video content items contains the query. "Two and a Half Men" may be more popular than "Harry Potter" in terms of global popularity. In other words, "Two and a Half Men" may have been output more times, regardless of query, than "Harry Potter" has been. However, when a user enters the query "HA," it may not be likely that the user wants to output "Two and a Half Men." Instead, it may be much more likely that a user who enters the query "HA" wants to output "Harry Potter." As a result, "Harry Potter" may be more popular than "Two and a Half Men" in terms of query-specific selection results. Accordingly, the query-specific ranking of the candidate search results may provide a ranking that is more in-line with user needs and expectations.

To further increase the probability that the first-ranked candidate search result is the video content item or video content provider that the user was actually looking for when he or she entered the query, the query-specific ranking technique may also rank based on query-specific selection results associated with different queries. The different queries may include longer queries that include the user's query. For example, if the user's query is a one-letter query "H," the query-specific ranking technique may rank the search results based (at least in part) on which video content items or video content providers that have been selected (e.g., "clicked on") for output the greatest number of times in the past when users entered the query "H." The query-specific ranking technique may additionally rank the search results based on which video content items or video content providers have been selected for output the greatest number of times in the past when users entered longer queries that include the query "H," such as "HA" or "HAR."

FIG. 1 shows a block diagram of an example system 100. The system 100 may be configured to perform query-specific ranking of search results in response to a user query. The system 100 may comprise a content distributor network 101 and a plurality of user devices 116*a-n*. The content distributor network 101 may be associated with a business entity that distributes video content items from various video content providers to a plurality of users associated with the user devices 116*a-n*. The content distributor network 101 and a plurality of user devices 116*a-n* may be in communication via a network 120.

The network 120 may comprise a local area network, a wide area network, a wireless network, a wired network, the Internet, a combination thereof, or any other type of network over which the components of the system 100 may communicate. The network 120 may comprise one or more public networks (e.g., the Internet) and/or one or more private networks. A private network may include a wireless local area network (WLAN), a local area network (LAN), a wide area network (WAN), a cellular network, or an intranet. The network 120 may comprise wired network(s) and/or wireless network(s).

The plurality of user devices 116*a-n* may be any device capable of outputting video content items for output by a user. For example, the plurality of user devices 116*a-n* may be a set-top box, a mobile telephone, a tablet, a television, a smart television, or a personal computer. Each of the plurality of user devices 116a-n may comprise an interface 117a-n. The interfaces 117a-n may be configured to display content being output by the user devices 116a-n for output by one or more users. The interfaces 117a-n may be part of the user devices 116a-n such as in the example that the user devices 116a is a tablet or a computer. The interfaces 117a-n may be separate from the user devices 116a-n such as in an example that the user devices 116b is a set top box and the interfaces 117b is a television screen in electrical communication with the set top box.

The interfaces 117a-n may be configured to receive user input. The user input may include a query for a content entity. The term "content entity" is herein used to refer to either a video content item or a video content provider. For example, the user input may include a query for a video content item that a user wants to output. Additionally, or alternatively, the user input may include a query for a video content provider from which a user wants to output video content. The query may include one or more letters and/or one or more words. For example, the query "S" and/or the query "ST" may be input via the interfaces 117a-n if a user wants to output the video content item entitled "Star Wars." The query "H" might be used if a user wants to output video content from the video content provider "Hallmark Channel" or "Hulu." The plurality of user devices 116a-n may forward or send the user input, such as the queries, to the content distributor network 101.

The content distributor network 101 may comprise a content entity database 102, a training data generator 110, a machine learning module 112, and/or a training data database 104. The content entity database 102, the training data generator 110, the machine learning module 112, and/or the training data database 104 may be in communication via a network 114.

The network 114 may comprise a local area network, a wide area network, a wireless network, a wired network, the Internet, a combination thereof, or any other type of network over which the components of the system 100 may communicate. The network 114 may comprise one or more public networks (e.g., the Internet) and/or one or more private networks. A private network may include a wireless local area network (WLAN), a local area network (LAN), a wide area network (WAN), a cellular network, or an intranet. The network 114 may comprise wired network(s) and/or wireless network(s).

The content entity database 102 may comprise one or more databases configured to store content entity data 106 and/or click-through data 107. A video content item may comprise, as an example, a video program. A video program may refer generally to any video content produced for viewer output. A video program may comprise video content produced for broadcast via over-the-air radio, cable, satellite, or the internet. A video program may comprise video content produced for digital video streaming or video-on-demand. A video program may comprise a television show or program. A video program series may comprise two or more associated video programs. For example, a video program series may include an episodic or serial television series. As another example, a video program series may include a documentary series, such as a nature documentary series. As yet another example, a video program series may include a regularly scheduled video program series, such as a nightly news program. A video content provider may include, for example, a television broadcast network, a cable television network, a satellite television network, or a video distribution platform (e.g., streaming platform such as Hulu, Netflix, etc.).

The content entity data 106 may indicate a plurality of different video content items that the content distributor network 101 distributes to the user devices 116a-n. For example, the content entity data 106 may indicate one or more of the title, genre, rating, actors, or creation date associated with a plurality of different video content items. The content entity data 106 may alternatively or additionally indicate a plurality of different video content providers associated with video content items that the content distributor network 101 distributes to the user devices 116a-n. For example, the content entity data 106 may indicate a name associated with a plurality of different video content providers.

The click-through data 107 may indicate a popularity associated with each content entity indicated by the content entity data 106. The popularity associated with a particular content entity may indicate a quantity of times that the content entity has been selected by a user for output. While the click-through data 107 may indicate a global popularity associated with each content entity (e.g., how many times each content entity has been selected for output regardless of user query), the click-through data 107 may alternatively or additionally indicate a query-specific selection results associated with each content entity. The query-specific selection results may indicate, per user query, a quantity of times that the content entity has been selected (e.g., clicked on) by a user for output.

For example, for a content entity entitled "Harry Potter," the query-specific selection results may indicate a quantity of times that the content entity entitled "Harry Potter" has been selected (e.g., clicked on) by a user for output after the user entered the query "H." The query-specific selection results may additionally indicate a quantity of times that the content entity entitled "Harry Potter" was been selected by a user for output after the user entered the query "HA," a quantity of times that the content entity entitled "Harry Potter" was been selected by a user for output after the user entered the query "HAR," and so on. Accordingly, the click-through data 107 may indicate, for each query, the content entities that have been selected the greatest number of times and the content entities that have been selected the fewest number of times. Additionally, or alternatively, the click-through data 107 may indicate, for each query, a quantity of times each content entity of a plurality of content entities has been selected for output.

The content entity database 102 may be implemented in the form of a network storage, such as, for example, a cloud-based storage accessible by other systems or devices via a network, such as the network 114. In addition to the content entity data 106 and/or click-through data 107, the content entity database 102 may store other information associated with the content entities or a service provider that maintains or operates the content entity database 102. The content entity database 102 may comprise one or more computing devices and/or network devices. For example, the content entity database 102 may comprise one or more networked servers. The content entity database 102 may each comprise a data storage device and/or system, such as a network-attached storage (NAS) system.

The training data generator 110 may generate training data based at least on the content entity data 106 and/or the click-through data 107. To generate the training data, the training data generator 110 may generate a plurality of data pairs. Each data pair may indicate both a particular query that has been previously entered by a user and a content entity that the user selected after entering that query. An example data pair may indicate that a user entered a query "ST" and then selected the movie "A Star is Born." The training data generator 110 may generate a large quantity of these pairs (such as thousands, hundreds of thousands, or even millions of pairs).

The training data generator 110 may be implemented in one or more computing devices. Such a computing device may comprise one or more processors and memory storing instructions that, when executed by the one or more processors, cause the computing device to perform one or more of the various methods or techniques described here. The memory may comprise volatile memory (e.g., random access memory (RAM)) and/or non-volatile memory (e.g., a hard or solid-state drive). The memory may comprise a non-transitory computer-readable medium. The computing device may comprise one or more input devices, such as a mouse, a keyboard, or a touch interface. The computing device may comprise one or more output devices, such as a monitor or other video display. The computing device may comprise an audio input and/or output. The computing device may comprise one or more network communication interfaces, such as a wireless transceiver (e.g., Wi-Fi or cellular) or wired network interface (e.g., ethernet). The one or more network communication interfaces may be configured to connect to the network 114.

The training data generator 110 may comprise one or more computing devices and/or network devices. For example, the training data generator 110 may comprise one or more networked servers. The training data generator 110 may comprise a data storage device and/or system, such as a network-attached storage (NAS) system.

The data pairs may be stored in the training data database 104 as pairwise training data 105. The training data database 104 may be implemented in the form of a network storage, such as, for example, a cloud-based storage accessible by other systems or devices via a network, such as the network 114. In addition to the pairwise training data 105, the training data database 104 may store other information associated with the content entities, training data, or a service provider that maintains or operates the training data database 104. The training data database 104 may comprise one or more computing devices and/or network devices. For example, the training data database 104 may comprise one or more networked servers. The training data database 104 may each comprise a data storage device and/or system, such as a network-attached storage (NAS) system.

The training data generated by the training data generator 110 may be used to train the machine learning model 112 to rank content entities. For example, the pairwise training data 105 stored in the training data database 104 may be used to train the machine learning model 112. The machine learning model 112 may be trained to rank candidate search results for various user-entered queries.

Candidate search results for a particular query may include those content entities that correspond to the query. Candidate search results for a particular query may include video content items having a title that includes the query. Candidate search results for a particular query may additionally or alternatively include video content providers having a name that includes the query. For example, candidate search results for the query "HA" may include video content items such as "Harry Potter" and "Two and a Half Men," and/or video content providers such as "Hallmark Channel."

The machine learning model 112 may be trained to rank, based on query-specific selection results, candidate search results for various user-entered queries. As discussed above, as compared to a global popularity ranking (which ranks according to popularity, regardless of query), a query-specific ranking ranks the candidate search results according to query-specific selection results. For example, the first-ranked candidate search result associated with a particular query may be the video content item or video content provider that has been selected (e.g., "clicked on") for output the greatest number of times in the past when users entered that query (as compared to the other candidate search results). Ranking the candidate search results based on query-specific selection results may increase the probability that the first-ranked candidate search result is the video content item or video content provider that the user was actually looking for when he or she entered the query.

The machine learning model 112 may be trained to rank a set of candidate results for a first query based on click-through data 107 associated with the first query. For example, the machine learning model 112 may be trained to rank a set of candidate search results for a first query based on some or all of the pairwise training data 105 that includes the first query. If the first query is "H," the machine learning model 112 may be trained to rank a set of candidate results for the first query based on data pairs such as (H, Harry Potter), (H, Hulu), (H, Harry Potter), (H, Two and a Half Men), etc. By training the machine learning model 112 to rank a set of candidate search results for a first query based on some or all of the pairwise training data 105 that includes the first query, the trained machine learning model 112 may later be able to perform a query-specific ranking on candidate search results for the first query in response to receiving the first query from a user.

The machine learning model 112 may be trained to rank a set of candidate results for a second query based on click-through data 107 associated with the second query. The second query may include the first query. For example, the machine learning model 112 may be trained to rank a set of candidate search results for a second query based on some or all of the pairwise training data 105 that includes the second query. If the second query is "HA," the machine learning model 112 may be trained to rank a set of candidate results for the second query based on data pairs such as (HA, Harry Potter), (HA, Hallmark Channel), (HA, Harry Potter), (HA, Two and a Half Men), etc. By training the machine learning model 112 to rank a set of candidate search results for a second query based on some or all of the pairwise training data 105 that includes the second query, the trained machine learning model 112 may later be able to perform a query-specific ranking on candidate search results for the second query in response to receiving the second query from a user As discussed above, to further increase the probability that the first-ranked candidate search result is the video content item or video content provider that the user was actually looking for when he or she entered the query, the query-specific ranking technique may also rank based on popular video content items or video content providers associated with different queries. The different queries may include longer queries that include the user's query.

For example, the machine learning model 112 may be trained to rank a set of candidate results for the first query "H" based on click-through data 107 associated with the second query "HA," which includes the first query "H." The machine learning model 112 may be trained to rank a set of candidate search results for the first query based on some or all of the pairwise training data 105 that includes the second query. For example, the machine learning model 112 may be trained to rank a set of candidate results for the first query based on data pairs such as (HA, Harry Potter), (HA, Hallmark Channel), (HA, Harry Potter), (HA, Two and a Half Men), (H, Harry Potter), (H, Hulu), (H, Harry Potter), (H, Two and a Half Men), etc. By training the machine learning model 112 to rank a set of candidate search results for a first query based on some or all of the pairwise training data 105 that includes the second query, the trained machine learning model 112 may later be able to perform a query-specific ranking on candidate search results for the first query in response to receiving the first from a user.

The trained machine learning model 112 may implement one or more techniques described herein for ranking candidate search results associated with a query based on query-specific selection results. For example, the trained machine learning model 112 may receive, such as from a user device 116*a-n*, a request for ranked candidate search results. The request may be based on a query entered by a user on an interface 117*a-n* of the user device 116*a-n*. In response to receiving the request, the trained machine learning model 112 may determine a set of candidate results associated with the query. The trained machine learning model 112 may then rank these candidate search results based on query-specific selection results.

The trained machine learning model 112 may cause output, via the user device 116*a-n*, of an indication of the ranked candidate results. As discussed above, the search result(s) may be presented in the form of images on the interface of the user device. For example, each video content item having a title that includes the entered query and/or each video content provider having a name that includes the entered query may be associated with the image. The image associated with a video content item may be, for example, a frame taken from the video content item or a movie/ television poster used to advertise the video content item. The image associated with a video content producer may be, for example, an image of a logo associated with the video content producer. The trained machine learning model 112 may cause output, via the user device 116*a-n*, of the images associated with the candidate results, such as in an order according to the query-specific ranking. For example, the trained machine learning model 112 may cause output, via an interface 117*a-n* of the user device 116*a-n*, of the images associated with the candidate results, such as in an order according to the query-specific ranking.

The machine learning model 112 may be implemented in one or more computing devices. The machine learning model 112 may comprise one or more of neural networks, gradient boosted trees, or linear regression models. Such a computing device may comprise one or more processors and memory storing instructions that, when executed by the one or more processors, cause the computing device to perform one or more of the various methods or techniques described here. The memory may comprise volatile memory (e.g., random access memory (RAM)) and/or non-volatile memory (e.g., a hard or solid-state drive). The memory may comprise a non-transitory computer-readable medium. The computing device may comprise one or more input devices, such as a mouse, a keyboard, or a touch interface. The computing device may comprise one or more output devices, such as a monitor or other video display. The computing device may comprise an audio input and/or output. The computing device may comprise one or more network communication interfaces, such as a wireless transceiver (e.g., Wi-Fi or cellular) or wired network interface (e.g., ethernet). The one or more network communication interfaces may be configured to connect to the network 114.

The machine learning model 112 may comprise one or more computing devices and/or network devices. For example, the machine learning model 112 may comprise one or more networked servers. The machine learning model 112 may comprise a data storage device and/or system, such as a network-attached storage (NAS) system.

Figure 2:
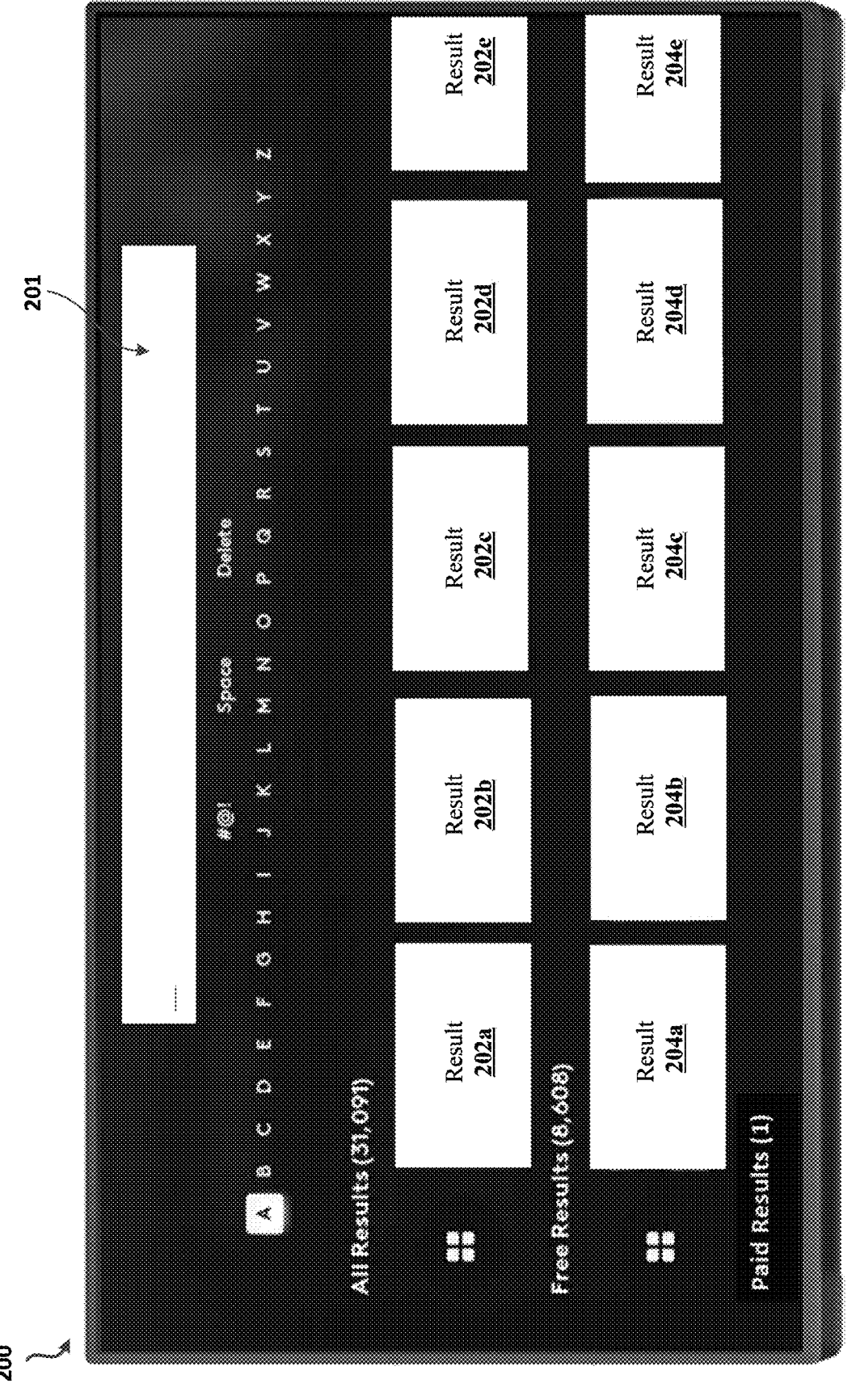
FIG. 2 shows an example user interface.

FIG. 2 shows an interface 200 of a user device (e.g., user device 116*a-n*). The interface 200 may be, for example, an interface 117*a-n*. The interface 200 may be configured to receive user input via a search bar 201. The user input may include a query for a content entity, such as a video content item or a video content provider. For example, the user input may include a query for a video content item that a user wants to output. Additionally, or alternatively, the user input may include a query for a video content provider from which a user wants to output video content.

The query may include one or more letters and/or one or more words. The user may use a keyboard, such as a keyboard provided on the interface 200 or a keyboard external to the interface 200, to enter the query into the search bar 201. For example, the user may enter the query "S" and/or the query "ST" into the search bar 201 if the user wants to output the video content item entitled "Star Wars." The user may enter the query "H" into the search bar 201 if the user wants to output video content from the video content provider "Hallmark Channel" or "Hulu."

As the user enters the query into the search bar 201, the user device may forward or send the query to the content distributor network 101. For example, each time the user enters a single letter into the search bar 201, the user device may forward or send the letter to the content distributor network 101. The content distributor network 101 (such as the machine learning model 112), may send back ranked candidate search results in response to the letter. An indication of these ranked search results 202*a-e* (all results, whether free or paid) and/or 204*a-e* (free results that a user does not need to pay to output) may be output on the interface 200. For example, the indication of these ranked search results 202*a-e* and/or 204*a-e* may include images associated with the candidate results. The images may be output on the interface 200 in an order according to the query-specific ranking. For example, the image corresponding to the first result 202*a* is presented first in the "free results" section. This may indicate that the content entity associated with the first image was first-ranked in the query-specific ranking.

If the user enters an additional letter into the search bar 201 (so that the query is now a two-letter query), the user device may forward or send the two-letter query to the content distributor network 101. The content distributor network 101 (such as the machine learning model 112), may send back ranked candidate search results in response to the two-letter. These updated ranked candidate search results may be output on the interface 200. This process of the user entering an additional letter and the search results updating may repeat, such as until the user is done entering the query and/or until the user selects a content entity for output.

Figure 3:
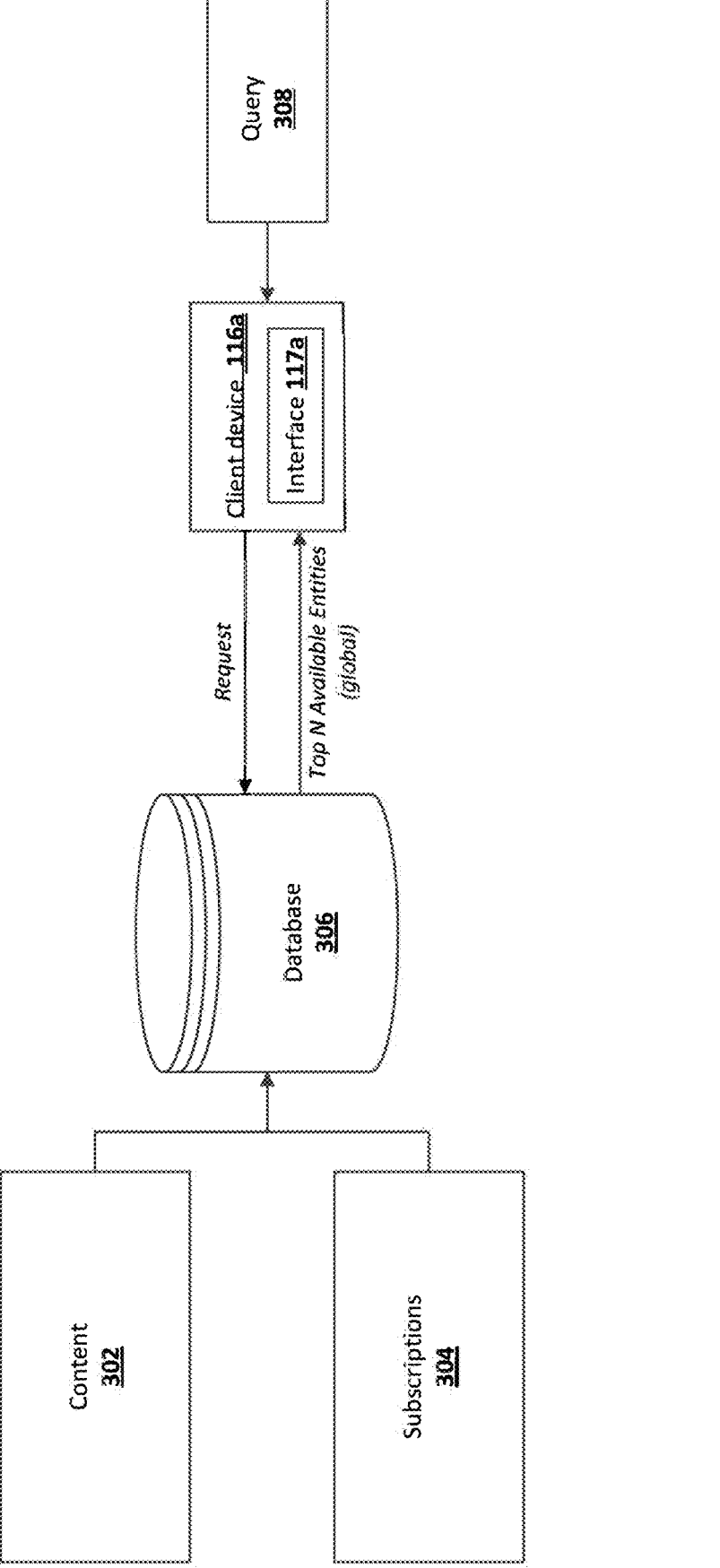
FIG. 3 shows example system for search result ranking.

FIG. 3 shows example system 300 for search result ranking based on global popularity. As discussed above, previous search result ranking systems employed a global ranking technique. A user may enter a query 308 via an interface 117*a* of a user device 116*a*. The user device 116*a* may send or forward a request for content entities associated with the query 308, such as to a database 306. The database 306 may store content entities 302 and/or subscription data 304. The subscription data 304 may indicate various access levels associated with various users. For example, certain users may not subscribe to certain video content providers and may therefore not have access to the content provided by such video content providers. Conversely, certain users may subscribe to certain video content providers, and may therefore have access to the content provided by such video content providers.

The database 306 may return to the user device 116a-n candidate search results associated with the query 308. The candidate search results associated with the query 308 may be globally ranked (e.g., ranked by all-time popularity, regardless of query). An indication of these globally ranked candidate search results may be presented on the interface 117a of a user device 116a. For example, images associated with the search results may be presented on the interface of the user device in an order based on the global popularity ranking. For example, the image presented first on the interface of the user device may be associated with the video content item or video content provider that has been selected for output the greatest quantity of times in the past (as compared to the other search results). Likewise, the image presented last on the interface of the user device may be associated with the video content item or video content provider that has been selected for output the fewest quantity of times in the past (as compared to the other search results).

However, presenting the search results in an order based on global popularity may lead to a poor user experience. For example, the image presented first, second, third, etc. on the interface of the user device may not be associated with the video content item or video content provider that the user was actually looking for. As a result, the user may have to spend a large quantity of time scrolling through the search result images in order to find the desired video content item or video content provider. In some instances, the user may need to scroll through hundreds or thousands of search result images before finding the desired video content item or video content provider. The user may become frustrated, and in some instances, may give up before they even find the desired video content item or video content provider.

Figure 4:
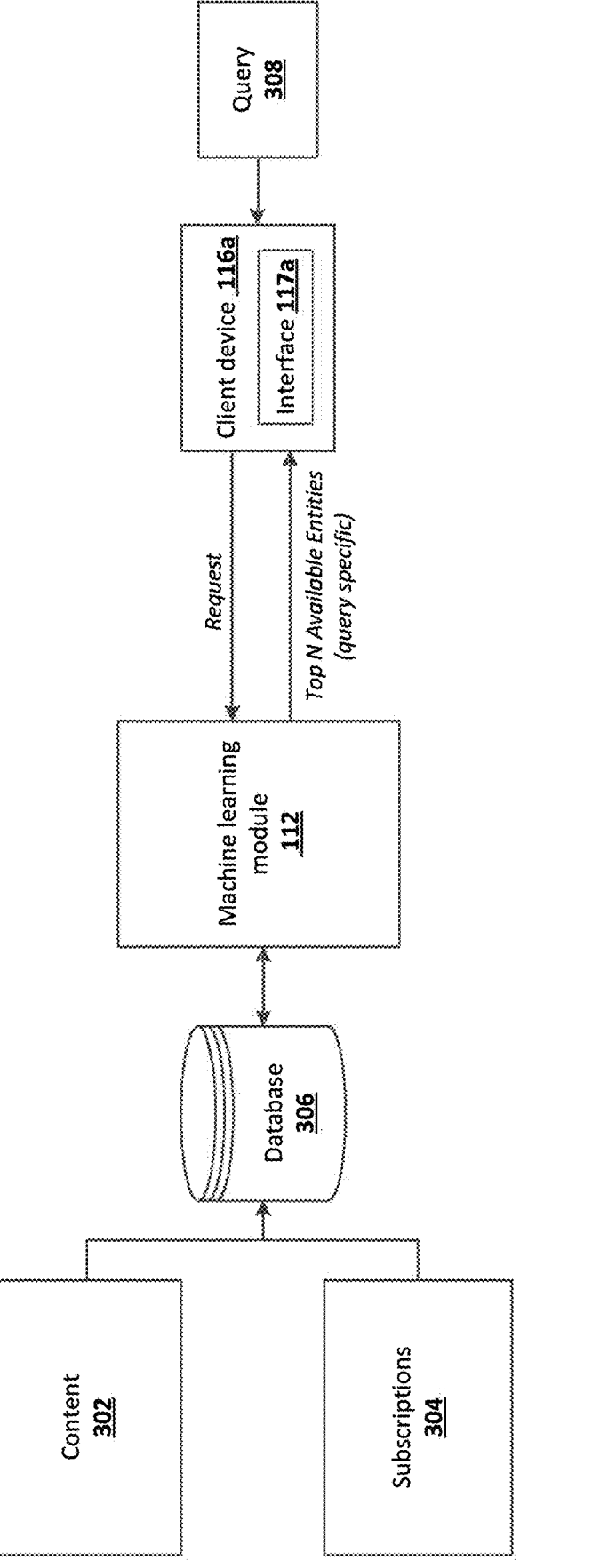
FIG. 4 shows an example system for search result ranking based on query-specific selection results.

FIG. 4 shows an example system 400 for search result ranking based on query-specific selection results. Such a query-specific ranking technique ranks the search results based on query-specific selection results, rather than based on global popularity. Ranking the search results based on query-specific selection results may increase the probability that the first-ranked search result is the video content item or video content provider that the user was actually looking for when he or she entered the query. Accordingly, ranking the search results based on query-specific selection results may increase the probability that the first search result image presented on the user interface is associated with the video content item or video content provider that the user was actually looking for.

As compared to a global popularity ranking (which ranks according to popularity, regardless of query) utilized by the system 300, the query-specific ranking utilized by the system 400 ranks the candidate search results according to query-specific selection results.

A user may enter the query 308 via an interface 117a of a user device 116a. The user device 116a may send or forward a request for content entities associated with the query 308, such as to the trained machine learning model 112. The machine learning model 112 may be in communication with a database 306. The machine learning model 112 may forward, to the database 306, the request associated with the query. The database 306 may store content entities 302 and/or subscription data 304. The subscription data 304 may indicate various access levels associated with various users. For example, certain users may not subscribe to certain video content providers and may therefore not have access to the content provided by such video content providers. Conversely, certain users may subscribe to certain video content providers, and may therefore have access to the content provided by such video content providers.

The database 306 may return to the machine learning model 112 candidate search results associated with the query 308. The trained machine learning model 112 may rank the candidate search results based on query-specific selection results, such as in the manner described above with respect to FIG. 1. An indication of these candidate search results, ranked based on query-specific selection results, may be presented on the interface 117a of a user device 116a. For example, images associated with the search results may be presented on the interface of the user device in an order based on the query-specific ranking. For example, the first-ranked search result associated with a particular query may be the video content item or video content provider that has been selected for output the greatest number of times in the past when users entered that query or a different query containing that query (as compared to the other search results). Accordingly, the image associated with the first-ranked search result may appear first on the interface 117a of a user device 116a.

FIG. 5 shows an example set 500 of entities being ranked based on query-specific selection results. The entities may be ranked, for example, by the trained machine learning model 112. Each row (a)-(d) of the table 500 shows a particular content entity's popularity associated with a particular query. The first column 501 indicates an identification of the content entity, the second column 502 indicates a query, and the third column 503 indicates a popularity (e.g., a number of clicks or selections for output).

The first row (a) indicates that an entity ID is "Harry Potter." The entity ID "Harry Potter" was selected 90 times for output when users entered the query "HA." The second row (b) indicates that an entity ID is "Hallmark Channel." The entity ID "Hallmark Channel" was selected 100 times for output when users entered the query "HA." The third row (c) indicates that an entity ID is "A Star is Born." The entity ID "A Star is Born" was selected 82 times for output when users entered the query "STA." The fourth row (d) indicates that an entity ID is "Stanley Tucci: Searching for Italy." The entity ID "Stanley Tucci: Searching for Italy" was selected 100 times for output when users entered the query "STA."

Accordingly, the HA-query-specific selection results for "Hallmark Channel" is greater than the HA-query-specific selection results for "Harry Potter." Likewise, the STA-query-specific selection results for "Stanley Tucci: Searching for Italy" Channel is greater than the STA-query-specific selection results for "A Star is Born." The table 504 indicates these query-specific rankings. Each row (a) and (b) of the column 504 are associated with a particular query. As indicated by the column 507, the first row (a) is associated with the query "HA" and the second row (b) is associated with the query "STA." The first column 505 indicates the most popular entity, based on a query-specific selection results, associated with the respective query. The second column 506 indicates the second most popular entity, based on a query-specific popularity, associated with the respective query.

For example, the most popular entity, based on a query-specific popularity, associated with the query "HA" is Hallmark Channel. The second most popular entity, based on a query-specific popularity, associated with the query "HA" is Harry Potter. Likewise, the most popular entity, based on a query-specific selection results, associated with the query "STA" is "Stanley Tucci: Searching for Italy." The second most popular entity, based on a query-specific selection results, associated with the query "STA" is "A Star is Born."

FIG. 6 shows an example set 600 of entities ranked based on query-specific selection results. The entities may be ranked, for example, by the trained machine learning model 112. Each row (a)-(d) of the column table 600 is associated with a particular query. As indicated by the column 606, the first row (a) is associated with the query "SHR," the second row (b) is associated with the query "WAY," the third row (c) is associated with the query "AUS," and the fourth row (d) is associated with the query "RETURN." The first column 602 indicates the most popular entity, based on a query-specific popularity, associated with the respective query. The second column 604 indicates the second most popular entity, based on a query-specific popularity, associated with the respective query.

For example, the most popular entity, based on a query-specific popularity, associated with the query "SHR" is "Shrek." The second most popular entity, based on a query-specific popularity, associated with the query "SHR" is "Shrek 2." The most popular entity, based on a query-specific popularity, associated with the query "WAY" is "Wayne's World 2." The second most popular entity, based on a query-specific popularity, associated with the query "WAY" is "Wayne's World." The most popular entity, based on a query-specific selection results, associated with the query "AUS" is "Austin Powers." The second most popular entity, based on a query-specific selection results associated with the query "AUS" is "Austin Spurs." The most popular entity, based on a query-specific selection results, associated with the query "RETURN" is "Lord of the Rings: Return of the King." The second most popular entity, based on a query-specific popularity, associated with the query "RETURN" is "Star Wars: Return of the Jedi."

FIG. 7 shows an example set 700 of entities being ranked based on query-specific popularity. The entities may be ranked, for example, by the trained machine learning model 112. Each row (a)-(d) of the table 700 shows a particular content entity's popularity associated with a particular query. The first column 701 indicates an identification of the content entity, the second column 702 indicates a query, and the third column 704 indicates a query-specific selection results.

The first row (a) indicates that an entity ID is "Hallmark Channel." The entity ID "Hallmark Channel" was selected 100 times for output when users entered the query "HA." The second row (b) indicates that an entity ID is "Hallmark Channel." The entity ID "Hallmark Channel" was selected 200 times for output when users entered the query "HAL." The third row (c) indicates that an entity ID is "Harry Potter." The entity ID "Harry Potter" was selected 90 times for output when users entered the query "HA." The fourth row (d) indicates that an entity ID is "Harry Potter." The entity ID "Harry Potter" was selected 500 times for output when users entered the query "HAR."

As discussed above, to further increase the probability that the first-ranked candidate search result is the video content item or video content provider that the user was actually looking for when he or she entered the query, the trained machine learning model 112 may also rank search results based on query-specific selection results associated with certain queries. The query-specific selection results may be determined based on click-through data associated with different queries. The different queries may include longer queries that include the user's query. For example, if the user's query is a one-letter query "H," the query-specific ranking technique may rank the search results based (at least in part) on which video content items or video content providers that have been selected for output the greatest number of times in the past when users entered the query "H." The query-specific ranking technique may additionally rank the search results based on which video content items or video content providers that have been selected for output the greatest number of times in the past when users entered longer queries that include the query "H," such as "HA" or "HAR."

The table 706 shows the query-specific rankings indicated by the table 700 being adjusted based on additional query data. For example, the table 700 indicates that the entity ID "Hallmark Channel" was selected 100 times for output when users entered the query "HA," and was selected 200 times for output when users entered the query "HAL." The 200 selections (e.g., "clicks") associated with the query "HAL" may be added to the 100 selections associated with the query "HA." Accordingly, the adjusted data indicated in the table 706 indicates that the content entity ID "Hallmark Channel" was selected 100+200 (e.g., 300) times for output when users entered the query "HA." The table 700 additionally indicates that the entity ID "Harry Potter" was selected 90 times for output when users entered the query "HA," and was selected 500 times for output when users entered the query "HAR." The 500 selections associated with the query "HAR" may be added to the 90 selections associated with the query "HA." Accordingly, the adjusted data indicated in the table 706 indicates that the content entity ID "Harry Potter" was selected 90+500 9 (e.g., 300) times for output when users entered the query "HA." These adjusted numbers for selections/clicks may be stored in the content entity database 102 and may be used to generate the pairwise training data 105.

Figure 8:
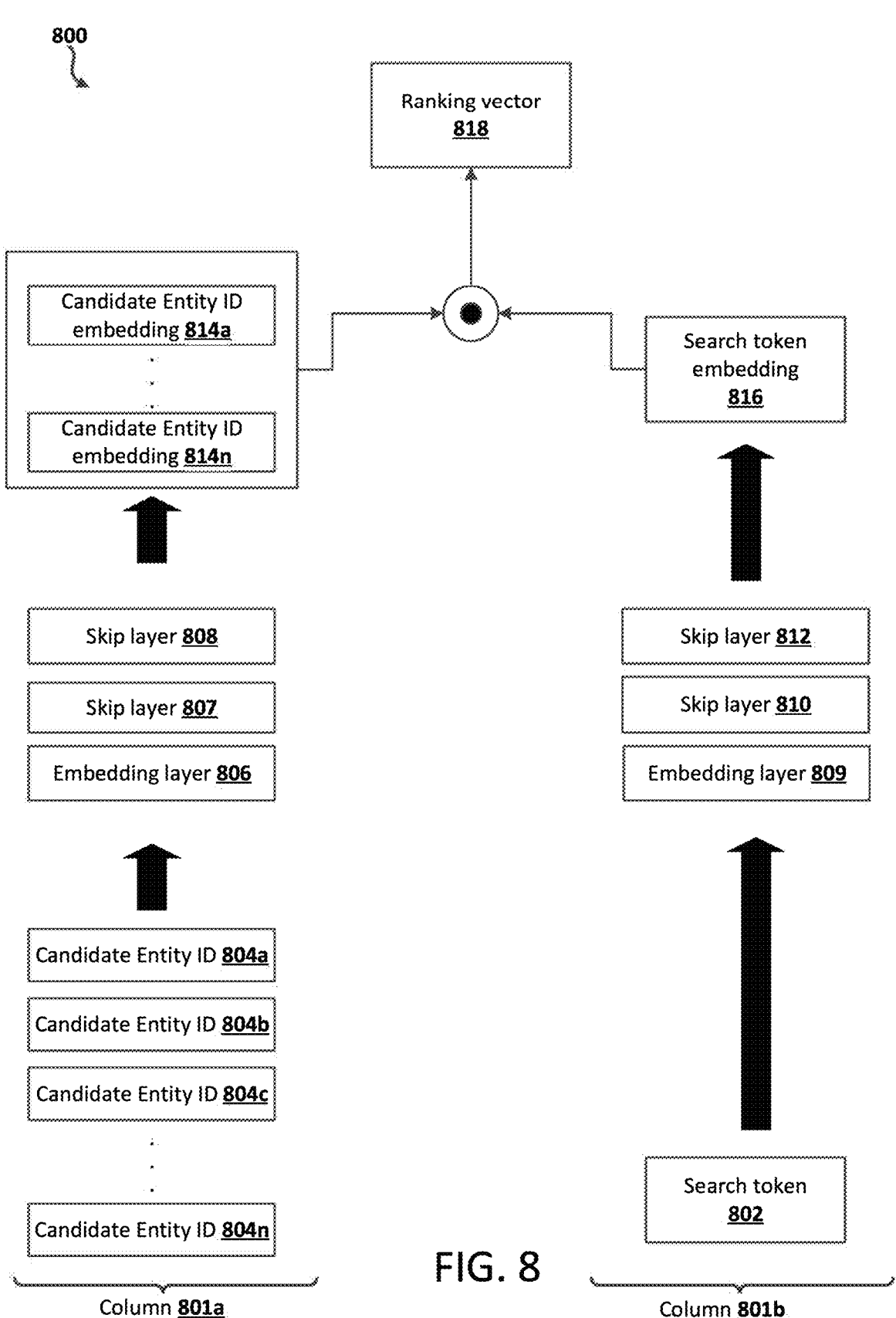
FIG. 8 shows an example architecture for a machine learning model.

FIG. 8 shows an example architecture 800 for a machine learning model, such as the machine learning model 112. The machine learning model may include one or more of neural network(s), gradient boosted tree(s), or linear regression model(s). The machine learning model may be trained to learn which content entities are popular based on click-through data. A query may be input into the trained machine learning model. The trained machine learning model may output the best query-specific ranking of candidate search results based on that click-through data. The architecture 800 may comprise a "two-tower" machine learning model, in which the model comprises two towers/columns 801*a-b*. The first column 801*a* may be associated with the candidate search results associated with a particular query. The second column 801*b* may be associated with the query itself.

A search token 802 may be received. The search token 802 may be a string of letters associated with the query. For example, if the query is "H," the search token 802 may be the string "H." Likewise, if the query is "HA," the search token 802 may be the string "HA." A plurality of candidate entity IDs 804*a-n* may also be received. The plurality of candidate entity IDs 804*a-n* may indicate a plurality of identification numbers or codes associated with candidate results for the query associated with the search token 802. For example, if the search token 802 is the string "H," the plurality of candidate entity IDs 804*a-n* may indicate identification numbers or codes associated with candidate results such as "Harry Potter," "Hallmark Channel," "Hulu," "Two and Half Men," and/or any other content entity associated with the query "H."

The search token 802 and the candidate entity IDs 804*a-n* may be passed through an embedding layer associated with their respective tower/column. For example, the search token 802 may be passed through the embedding layer 809 and the candidate entity IDs 804*a-n* may be passed through the embedding layer 806. The embedding layer 809 may determine a vector associated with the search token 802. Likewise, the embedding layer 806 may determine a vector associated with each of the candidate entity IDs 804*a-n*.

The vector associated with the search token 802 and the vectors associated with each of the candidate entity IDs 804*a-n* may be passed through one or more skip layers associated with their respective tower/column. A skip layer (e.g., skip connection) may skip some layer in the neural network and feed the output of one layer as the input to the next layers (instead of only the next one). For example, the vector associated with the search token 802 may be passed through the skip layers 810, 812 and the vectors associated with each of the candidate entity IDs 804*a-n* may be passed through the skip layers 807, 808. The skip layers 810, 812 may output a second vector 816 associated with the search token 802 and the skip layers 810, 812 may output a second vector 814*a-n* associated with each of the candidate entity IDs 804*a-n*. The second vector 816 and the set of second vectors 814*a-n* may be combined. For example, a dot product second vector 816 and the set of second vectors 814*a-n* may be determined. The resulting vector may provide a ranking for every candidate ID 804*a-n* that was passed in, given the search token 802.

FIG. 9 shows an example method 900. The method 900 may be used to rank candidate search results based on query-specific selection results. The method 900 may be performed, for example, by one or more components of the content distributor network 101 of FIG. 1. Although depicted as a sequence of operations in FIG. 9, those of ordinary skill in the art will appreciate that various embodiments may add, remove, reorder, or modify the depicted operations.

As discussed above, a user may enter, via an interface (e.g., interface 117*a-n*) of a user device (e.g., user device 116*a-n*), a query. The first query may comprise a query for a content entity. As discussed above, the term "content entity" may refer to either a video content item or a video content provider. For example, the first query may comprise a query for a video content item that a user wants to output. Additionally, or alternatively, the first query may comprise a query for a video content provider from which a user wants to output video content. The query may include one or more letters and/or one or more words. For example, the first query may comprise a single letter, such as the letter "H." The user device may forward or send the first query to the content distributor network 101. At 902, a first query may be received from the user device. For example, the first query may be received from the user device by a machine learning model (e.g., machine learning model 112) associated with the content distributor network 101 and/or by a content entity database 102 associated with the content distributor network 101.

At 904, a set of candidate results associated with the first query may be determined. Candidate results associated with the first query may include those content entities that correspond to the first query. For example, candidate results associated with the first query may include video content items having a title that includes the query. Candidate results for the first query may additionally or alternatively include video content providers having a name that includes the first query. For example, candidate search results for the single-letter query "H" may include video content items such as "Harry Potter" and "Two and a Half Men," and/or video content providers such as "Hallmark Channel."

A machine learning model (e.g., the machine learning model 112) may be trained to rank, based on query-specific selection results, candidate results for various user-entered queries, such as the first query. As discussed above, as compared to a global popularity ranking (which ranks according to popularity, regardless of query), a query-specific ranking ranks the candidate results according to query-specific selection results (as indicated by click-through data, such as the click through data 107). For example, the first-ranked candidate search result associated with a particular query may be the video content item or video content provider that has been selected for output the greatest number of times in the past when users entered that query (as compared to the other candidate search results). Ranking the candidate search results based on query-specific selection results may increase the probability that the first-ranked candidate search result is the video content item or video content provider that the user was actually looking for when he or she entered the query. At 906, the set of candidate results may be ranked. The set of candidate results may be ranked, for example, based on inputting the set of candidate results in a trained machine learning model.

The trained machine learning model may be trained using data indicating previously selected candidate results output in response to the first query. For example, the machine learning model may be trained to rank a set of candidate results for the first query based on click-through data (e.g., the click-through data 107) associated with the first query. For example, the machine learning model may be trained to rank a set of candidate results for the first query based on some or all of the pairwise training data (e.g., the pairwise training data 105) that includes the first query. If the first query is "H," the machine learning model may be trained to rank a set of candidate results for the first query based on data pairs such as (H, Harry Potter), (H, Hulu), (H, Harry Potter), (H, Two and a Half Men), etc. By training the machine learning model to rank a set of candidate search results for a first query based on some or all of the pairwise training data that includes the first query, the trained machine learning model may later be able to perform a query-specific ranking on candidate search results for the first query in response to receiving the first query from the user device.

The trained machine learning model may additionally or alternatively be trained using selected candidate results output in response to a second query that includes the first query. As discussed above, to further increase the probability that the first-ranked candidate search result is the video content item or video content provider that the user was actually looking for when he or she entered the first query, the query-specific ranking technique may also rank based on popular video content items or video content providers associated with different queries. The different queries may include longer queries that include the first query.

For example, the machine learning model may be trained to rank a set of candidate results for the first query "H" based on click-through data associated with a second query "HA," which includes the first query "H." The machine learning model may be trained to rank a set of candidate search results for the first query based on some or all of the pairwise training data that includes the second query. For example, the machine learning model may be trained to rank a set of candidate results for the first query "H" based on data pairs such as (HA, Harry Potter), (HA, Hallmark Channel), (HA, Harry Potter), (HA, Two and a Half Men), (H, Harry Potter), (H, Hulu), (H, Harry Potter), (H, Two and a Half Men), etc. By training the machine learning model to rank a set of candidate search results for a first query based on some or all of the pairwise training data that includes the second query, the trained machine learning model may later be able to perform a query-specific ranking on candidate search results for the first query in response to receiving the first from a user.

At 908, output of an indication of the ranked candidate results may be caused via the user device. As discussed above, the search result(s) may be presented in the form of images on the interface of the user device. For example, each video content item having a title that includes the entered query and/or each video content provider having a name that includes the entered query may be associated with the image. The image associated with a video content item may be, for example, a frame taken from the video content item or a movie/television poster used to advertise the video content item. The image associated with a video content producer may be, for example, an image of a logo associated with the video content producer.

Output, via the user device, of the images associated with the candidate results may be caused. For example, via the user device, of the images associated with the candidate results in an order according to the query-specific ranking may be caused. For example, the trained machine learning model may cause output, via an interface of the user device, of the images associated with the candidate results, such as in an order according to the query-specific ranking.

FIG. 10 shows an example method 1000. The method 1000 may be used to train a machine learning model, such as the machine learning model 112 of FIG. 1, to rank candidate search results by query. The method 1000 may be performed, for example, by one or more components of the content distributor network 101 of FIG. 1. For example, the method 1000 may be performed by a computing device associated with the content distributor network 101 of FIG. 1. The method 1000 may be repeated periodically, such as every day, every week, every month, etc. in order to ensure that the machine learning model is trained on the most recent click-through data. Although depicted as a sequence of operations in FIG. 10, those of ordinary skill in the art will appreciate that various embodiments may add, remove, reorder, or modify the depicted operations.

The machine learning model may be trained to rank, based on query-specific selection results, candidate search results for various user-entered queries. As discussed above, as compared to a global popularity ranking (which ranks according to popularity, regardless of query), a query-specific ranking ranks the candidate search results according to query-specific selection results. For example, the first-ranked candidate search result associated with a particular query may be the video content item or video content provider that has been selected for output the greatest number of times in the past when users entered that query (as compared to the other candidate search results). Ranking the candidate search results based on query on query-specific selection results may increase the probability that the first-ranked candidate search result is the video content item or video content provider that the user was actually looking for when he or she entered the query.

The machine learning model may be trained to rank a set of candidate results for a first query based on click-through data associated with the first query. At 1002, a machine learning model may be trained to rank candidate results for a first query based on the first query and first data indicating previously selected candidate results output in response to the first query. For example, the machine learning model may be trained to rank a set of candidate search results for a first query based on some or all of the pairwise training data that includes the first query. If the first query is "H," the machine learning model may be trained to rank a set of candidate results for the first query based on data pairs such as (H, Harry Potter), (H, Hulu), (H, Harry Potter), (H, Two and a Half Men), etc. By training the machine learning model to rank a set of candidate search results for a first query based on some or all of the pairwise training data that includes the first query, the trained machine learning model may later be able to perform a query-specific ranking on candidate search results for the first query in response to receiving the first query from a user.

The machine learning model may be trained to rank a set of candidate results for a second query that includes the first query based on click-through data associated with the second query. At 1004, the machine learning model may be trained to rank candidate results for the second query based on the second query and second data indicating previously selected candidate results output in response to a second query. For example, the machine learning model may be trained to rank a set of candidate search results for a second query based on some or all of the pairwise training data that includes the second query. If the second query is "HA," the machine learning model may be trained to rank a set of candidate results for the second query based on data pairs such as (HA, Harry Potter), (HA, Hallmark Channel), (HA, Harry Potter), (HA, Two and a Half Men), etc. By training the machine learning model to rank a set of candidate search results for a second query based on some or all of the pairwise training data that includes the second query, the trained machine learning model may later be able to perform a query-specific ranking on candidate search results for the second query in response to receiving the second query from a user As discussed above, to further increase the probability that the first-ranked candidate search result is the video content item or video content provider that the user was actually looking for when he or she entered the query, the query-specific ranking technique may also rank based on popular video content items or video content providers associated with different queries. The different queries may include longer queries that include the user's query. For example, the machine learning model may be trained to rank a set of candidate results for the first query ("H") based on click-through data associated with the second query ("HA," which includes the first query "H").

At 1006, the machine learning model may be further to rank the candidate results for the first query based on the second data indicating previously selected candidate results output in response to a second query. The machine learning model may be trained to rank a set of candidate search results for the first query based on some or all of the pairwise training data that includes the second query. For example, the machine learning model may be trained to rank a set of candidate results for the first query based on data pairs such as (HA, Harry Potter), (HA, Hallmark Channel), (HA, Harry Potter), (HA, Two and a Half Men), as well as (H, Harry Potter), (H, Hulu), (H, Harry Potter), (H, Two and a Half Men), etc. By training the machine learning model to rank a set of candidate search results for a first query based on some or all of the pairwise training data that includes the second query, the trained machine learning model may later be able to perform a query-specific ranking on candidate search results for the first query in response to receiving the first from a user.

The trained machine learning model may implement one or more techniques described herein for ranking candidate search results based on query-specific selection results. For example, the trained machine learning model may receive, such as from a user device, a request for ranked candidate search results. The request may be based on a query, such as the first query, entered by a user on an interface of the user device. In response to receiving the request, the trained machine learning model may determine a set of candidate results associated with the query. The trained machine learning model may then rank these candidate search results based on query-specific selection results.

Figure 11:
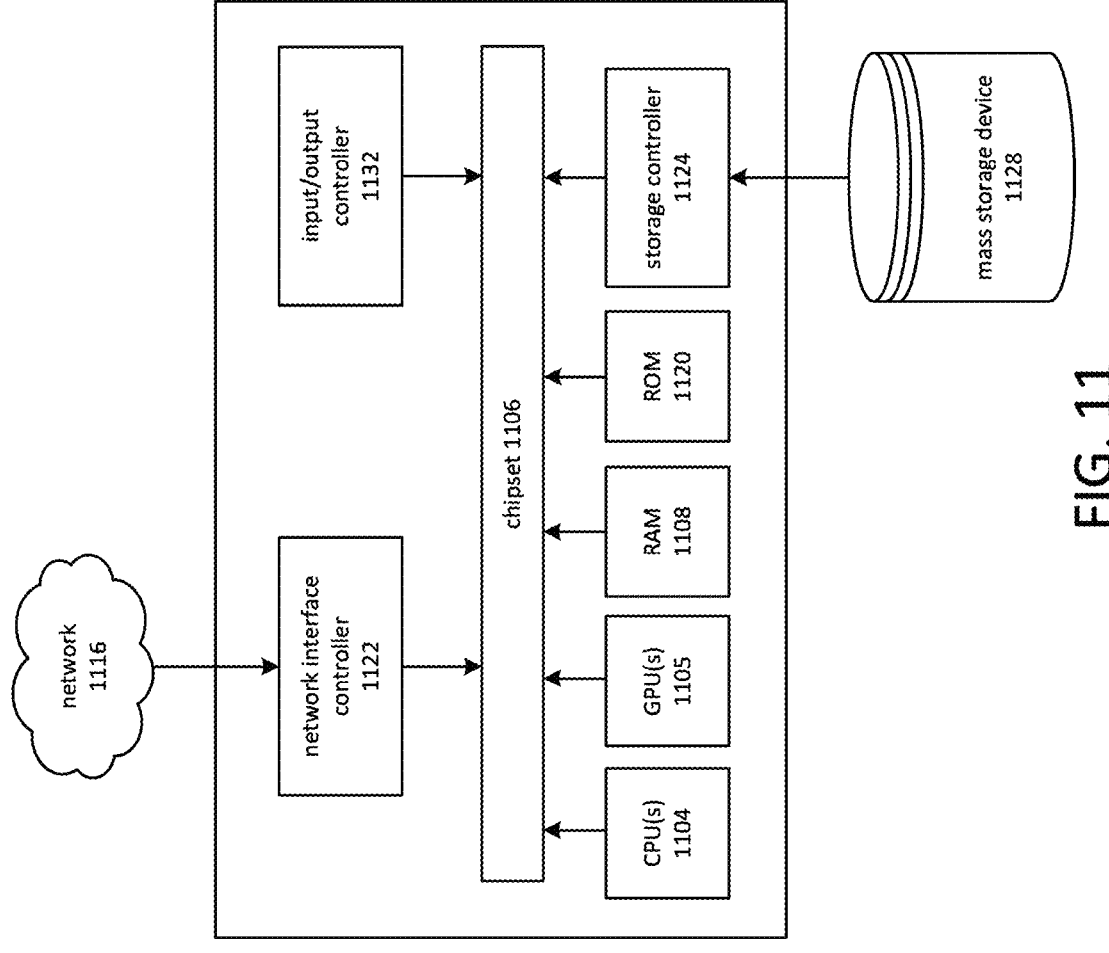
FIG. 11 shows an example computing device.

FIG. 11 shows a computing device 1100 that may be used in various aspects, such as the servers, modules, and/or devices depicted in FIG. 1. With regard to the example architecture of FIG. 1, the, server 102, the device 110, the masking window module, and/or the encoder 108 may each be implemented in an instance of a computing device 1100 of FIG. 11. The computer architecture shown in FIG. 11 shows a conventional server computer, workstation, desktop computer, laptop, tablet, network appliance, PDA, e-reader, digital cellular phone, or other computing node, and may be utilized to execute any aspects of the computers described herein, such as to implement the methods described in relation to FIGS. 6-7.

The computing device 1100 may include a baseboard, or "motherboard," which is a printed circuit board to which a multitude of components or devices may be connected by way of a system bus or other electrical communication paths. One or more central processing units (CPUs) 1104 may operate in conjunction with a chipset 1106. The CPU(s) 1104 may be standard programmable processors that perform arithmetic and logical operations necessary for the operation of the computing device 1100.

The CPU(s) 1104 may perform the necessary operations by transitioning from one discrete physical state to the next through the manipulation of switching elements that differentiate between and change these states. Switching elements may generally include electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 1104 may be augmented with or replaced by other processing units, such as GPU(s) 1105. The GPU(s) 1105 may comprise processing units specialized for but not necessarily limited to highly parallel computations, such as graphics and other visualization-related processing.

A chipset 1106 may provide an interface between the CPU(s) 1104 and the remainder of the components and devices on the baseboard. The chipset 1106 may provide an interface to a random access memory (RAM) 1108 used as the main memory in the computing device 1100. The chipset 1106 may provide an interface to a computer-readable storage medium, such as a read-only memory (ROM) 1120 or non-volatile RAM (NVRAM) (not shown), for storing basic routines that may help to start up the computing device 1100 and to transfer information between the various components and devices. ROM 1120 or NVRAM may also store other software components necessary for the operation of the computing device 1100 in accordance with the aspects described herein.

The computing device 1100 may operate in a networked environment using logical connections to remote computing nodes and computer systems through local area network (LAN) 1116. The chipset 1106 may include functionality for providing network connectivity through a network interface controller (NIC) 1122, such as a gigabit Ethernet adapter. A NIC 1122 may be capable of connecting the computing device 1100 to other computing nodes over a network 1116. It should be appreciated that multiple NICs 1122 may be present in the computing device 1100, connecting the computing device to other types of networks and remote computer systems.

The computing device 1100 may be connected to a mass storage device 1128 that provides non-volatile storage for the computer. The mass storage device 1128 may store system programs, application programs, other program modules, and data, which have been described in greater detail herein. The mass storage device 1128 may be connected to the computing device 1100 through a storage controller 1124 connected to the chipset 1106. The mass storage device 1128 may consist of one or more physical storage units. A storage controller 1124 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 1100 may store data on a mass storage device 1128 by transforming the physical state of the physical storage units to reflect the information being stored. The specific transformation of a physical state may depend on various factors and on different implementations of this description. Examples of such factors may include, but are not limited to, the technology used to implement the physical storage units and whether the mass storage device 1128 is characterized as primary or secondary storage and the like.

For example, the computing device 1100 may store information to the mass storage device 1128 by issuing instructions through a storage controller 1124 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 1100 may read information from the mass storage device 1128 by detecting the physical states or characteristics of one or more particular locations within the physical storage units.

In addition to the mass storage device 1128 described herein, the computing device 1100 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 1100.

By way of example and not limitation, computer-readable storage media may include volatile and non-volatile, transitory computer-readable storage media and non-transitory computer-readable storage media, and removable and non-removable media implemented in any method or technology.

However, as used herein, the term computer-readable storage media does not encompass transitory computer-readable storage media, such as signals. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A mass storage device, such as the mass storage device 1128 depicted in FIG. 11, may store an operating system utilized to control the operation of the computing device 1100. The operating system may comprise a version of the LINUX operating system. The operating system may comprise a version of the WINDOWS SERVER operating system from the MICROSOFT Corporation. According to additional aspects, the operating system may comprise a version of the UNIX operating system. Various mobile phone operating systems, such as IOS and ANDROID, may also be utilized. It should be appreciated that other operating systems may also be utilized. The mass storage device 1128 may store other system or application programs and data utilized by the computing device 1100.

The mass storage device 1128 or other computer-readable storage media may also be encoded with computer-executable instructions, which, when loaded into the computing device 1100, transforms the computing device from a general-purpose computing system into a special-purpose computer capable of implementing the aspects described herein. These computer-executable instructions transform the computing device 1100 by specifying how the CPU(s) 1104 transition between states, as described herein. The computing device 1100 may have access to computer-readable storage media storing computer-executable instructions, which, when executed by the computing device 1100, may perform the methods described in relation to FIGS. 6-7.

A computing device, such as the computing device 1100 depicted in FIG. 11, may also include an input/output controller 1132 for receiving and processing input from a number of input devices, such as a keyboard, a mouse, a touchpad, a touch screen, an electronic stylus, or other type of input device. Similarly, an input/output controller 1132 may provide output to a display, such as a computer monitor, a flat-panel display, a digital projector, a printer, a plotter, or other type of output device. It will be appreciated that the computing device 1100 may not include all of the components shown in FIG. 11, may include other components that are not explicitly shown in FIG. 11, or may utilize an architecture completely different than that shown in FIG. 11.

As described herein, a computing device may be a physical computing device, such as the computing device 1100 of FIG. 11. A computing node may also include a virtual machine host process and one or more virtual machine instances. Computer-executable instructions may be executed by the physical hardware of a computing device indirectly through interpretation and/or execution of instructions stored and executed in the context of a virtual machine.

It is to be understood that the methods and systems are not limited to specific methods, specific components, or to particular implementations. It is also to be understood that the terminology used herein is for the purpose of describing particular embodiments only and is not intended to be limiting.

As used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes— from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

"Optional" or "optionally" means that the subsequently described event or circumstance may or may not occur, and that the description includes instances where said event or circumstance occurs and instances where it does not.

Throughout the description and claims of this specification, the word "comprise" and variations of the word, such as "comprising" and "comprises," means "including but not limited to," and is not intended to exclude, for example, other components, integers or steps. "Exemplary" means "an example of" and is not intended to convey an indication of a preferred or ideal embodiment. "Such as" is not used in a restrictive sense, but for explanatory purposes.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific embodiment or combination of embodiments of the described methods.

The present methods and systems may be understood more readily by reference to the following detailed description of preferred embodiments and the examples included therein and to the Figures and their descriptions.

As will be appreciated by one skilled in the art, the methods and systems may take the form of an entirely hardware embodiment, an entirely software embodiment, or an embodiment combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Embodiments of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described herein may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described example embodiments. The example systems and components described herein may be configured differently than described. For example, elements may be added to, removed from, or rearranged compared to the described example embodiments.

It will also be appreciated that various items are illustrated as being stored in memory or on storage while being used, and that these items or portions thereof may be transferred between memory and other storage devices for purposes of memory management and data integrity. Alternatively, in other embodiments, some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

While the methods and systems have been described in connection with preferred embodiments and specific examples, it is not intended that the scope be limited to the particular embodiments set forth, as the embodiments herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of embodiments described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A method comprising:

receiving, from a user device, a first query to be applied to a database of content entities that are selectable by a user for output via the user device, wherein the first query comprises a first one or more characters;

determining a plurality of candidate content entities selectable from the database that are responsive to the first query;

ranking, using a machine learning model, the plurality of candidate content entities that are responsive to the first query, wherein the machine learning model is trained to rank the plurality of candidate content entities that are responsive to the first query using both (i) data indicating, for each of the plurality of candidate content entities, a quantity of times that the candidate content entity was previously selected for output by users who entered the first query and (ii) data indicating, for each of the plurality of candidate content entities, a quantity of times that the candidate content entity was previously selected for output by users who entered a second query comprising the first one or more characters of the first query and one or more additional characters; and causing output, via the user device, of an indication of the ranked plurality of candidate content entities.

2. The method of claim 1, wherein the ranking is performed without having received the second query from the user device.

3. The method of claim 1, wherein each of the plurality of candidate content entities comprises one of a content item or a content provider.

4. The method of claim 1, wherein each of the plurality of candidate content entities comprises at least one of a video content item associated with a title including the first query or a video content provider associated with a name including the first query.

5. The method of claim 1, wherein the indication of the ranked plurality of candidate content entities is associated with a plurality of images, each image of the plurality of images corresponding to a particular candidate content entity of the ranked plurality of candidate content entities.

6. The method of claim 5, wherein causing output, via the user device, of the indication of the ranked plurality of candidate content entities comprises:

causing output, via an interface of the user device, of the plurality of images in an order indicative of the ranked plurality of candidate content entities.

7. The method of claim 5, further comprising:

receiving, from the user device, a selection of an image from the plurality of images; and causing output, via the user device, of a candidate content entity corresponding to the selected image.

8. The method of claim 1, wherein the user device is at least one of a set-top box, a mobile telephone, a tablet, a television, a smart television, or a personal computer.

9. The method of claim 1, further comprising:

receiving, from the user device, the second query;

determining a plurality of candidate content entities selectable from the database that are responsive to the second query;

ranking, using the machine learning model, the plurality of candidate content entities that are responsive to the second query, wherein the machine learning model is trained to rank the plurality of candidate content entities responsive to the second query using both (i) data indicating, for each of the plurality of candidate content entities that are responsive to the second query, a quantity of times that the candidate content entity was previously selected for output by users who entered the second query, and (ii) data indicating, for each of the plurality of candidate content entities that are responsive to the second query, a quantity of times that the candidate content entity was previously selected for output by users who entered a third query comprising the first one or more characters of the first query, the one or more additional characters of the second query, and one or more further additional characters; and causing output, via the user device, of an indication of the ranked plurality of candidate content entities that are responsive to the second query.

10. A device comprising:

one or more processors; and memory storing instructions that, when executed by the one or more processors, cause the device to:

receive, from a user device, a first query to be applied to a database of content entities that are selectable by a user for output via the user device, wherein the first query comprises a first one or more characters;

determine a plurality of candidate content entities selectable from the database that are responsive to the first query;

rank, using a machine learning model, the plurality of candidate content entities that are responsive to the first query, wherein the machine learning model is trained to rank the plurality of candidate content entities that are responsive to the first query using both (i) data indicating, for each of the plurality of candidate content entities, a quantity of times that the candidate content entity was previously selected for output by users who entered the first query and (ii) data indicating, for each of the plurality of candidate content entities, a quantity of times that the candidate content entity was previously selected for output by users who entered a second query comprising the first one or more characters of the first query and one or more additional characters; and cause output, via the user device, of an indication of the ranked plurality of candidate content entities.

11. The device of claim 10, wherein the instructions that, when executed by the one or more processors, cause the device to rank the plurality of candidate content entities that are responsive to the first query comprise instructions that, when executed by the one or more processors, cause the device to rank the plurality of candidate content entities that are responsive to the first query without having received the second query from the user device.

12. The device of claim 10, wherein each of the plurality of candidate content entities comprises one of a content item or a content provider.

13. The device of claim 10, wherein each of the plurality of candidate content entities comprises at least one of a video content item associated with a title including the first query or a video content provider associated with a name including the first query.

14. The device of claim 10, wherein the indication of the ranked plurality of candidate content entities is associated with a plurality of images, each image of the plurality of images corresponding to a particular candidate content entity of the ranked plurality of candidate content entities.

15. The device of claim 14, wherein the instructions that, when executed by the one or more processors, cause the device to cause output, via the user device, of the indication of the ranked plurality of candidate content entities comprise instructions that, when executed by the one or more processors, cause the device to:

cause output, via an interface of the user device, of the plurality of images in an order indicative of the ranked plurality of candidate content entities.

16. The device of claim 14, wherein the instructions, when executed by the one or more processors, further cause the device to:

receive, from the user device, a selection of an image from the plurality of images; and cause output, via the user device, of a candidate content entity corresponding to the selected image.

17. The device of claim 10, wherein the user device is at least one of a set-top box, a mobile telephone, a tablet, a television, a smart television, or a personal computer.

18. The device of claim 10, wherein the instructions, when executed by the one or more processors, further cause the device to:

receive, from the user device, the second query;

determine a plurality of candidate content entities selectable from the database that are responsive to the second query;

rank, using the machine learning model, the plurality of candidate content entities that are responsive to the second query, wherein the machine learning model is trained to rank the plurality of candidate content entities responsive to the second query using both (i) data indicating, for each of the plurality of candidate content entities that are responsive to the second query, a quantity of times that the candidate content entity was previously selected for output by users who entered the second query, (ii) data indicating, for each of the plurality of candidate content entities that are responsive to the second query, a quantity of times that the candidate content entity was previously selected for output by users who entered a third query comprising the first one or more characters of the first query, the one or more additional characters of the second query, and one or more further additional characters; and cause output, via the user device, of an indication of the ranked plurality of candidate content entities that are responsive to the second query.

19. A non-transitory computer-readable medium storing instructions that, when executed, cause:

receiving, from a user device, a first query to be applied to a database of content entities that are selectable by a user for output via the user device, wherein the first query comprises a first one or more characters;

determining a plurality of candidate content entities selectable from the database that are responsive to the first query;

ranking, using a machine learning model, the plurality of candidate content entities that are responsive to the first query, wherein the machine learning model is trained to rank the plurality of candidate content entities that are responsive to the first query using both (i) data indicating, for each of the plurality of candidate content entities, a quantity of times that the candidate content entity was previously selected for output by users who entered the first query and (ii) data indicating, for each of the plurality of candidate content entities, a quantity of times that the candidate content entity was previously selected for output by users who entered a second query comprising the first one or more characters of the first query and one or more additional characters; and causing output, via the user device, of an indication of the ranked plurality of candidate content entities.

20. The non-transitory computer-readable medium of claim 19, wherein the instructions that, when executed, cause ranking the plurality of candidate content entities that are responsive to the first query comprise instructions that, when executed, cause ranking the plurality of candidate content entities that are responsive to the first query without having received the second query from the user device.

21. The non-transitory computer-readable medium of claim 19, wherein each of the plurality of candidate content entities comprises one of a content item or a content provider.

22. The non-transitory computer-readable medium of claim 19, wherein each of the plurality of candidate content entities comprises at least one of a video content item associated with a title including the first query or a video content provider associated with a name including the first query.

23. The non-transitory computer-readable medium of claim 19, wherein the indication of the ranked plurality of candidate content entities is associated with a plurality of images, each image of the plurality of images corresponding to a particular candidate content entity of the ranked plurality of candidate content entities.

24. The non-transitory computer-readable medium of claim 23, wherein the instructions that, when executed, cause causing output, via the user device, of the indication of the ranked plurality of candidate content entities comprise instructions that, when executed, cause:

causing output, via an interface of the user device, of the plurality of images in an order indicative of the ranked plurality of candidate content entities.

25. The non-transitory computer-readable medium of claim 23, wherein the instructions, when executed, further cause:

receiving, from the user device, a selection of an image from the plurality of images; and causing output, via the user device, of a candidate content entity corresponding to the selected image.

26. The non-transitory computer-readable medium of claim 19, wherein the user device is at least one of a set-top box, a mobile telephone, a tablet, a television, a smart television, or a personal computer.

27. The non-transitory computer-readable medium of claim 19, wherein the instructions, when executed, further cause:

receiving, from the user device, the second query;

determining a plurality of candidate content entities selectable from the database that are responsive to the second query;

ranking, using the machine learning model, the plurality of candidate content entities that are responsive to the second query, wherein the machine learning model is trained to rank the plurality of candidate content entities responsive to the second query using both (i) data indicating, for each of the plurality of candidate content entities that are responsive to the second query, a quantity of times that the candidate content entity was previously selected for output by users who entered the second query, (ii) data indicating, for each of the plurality of candidate content entities that are responsive to the second query, a quantity of times that the candidate content entity was previously selected for output by users who entered a third query comprising the first one or more characters of the first query, the one or more additional characters of the second query, and one or more further additional characters; and causing output, via the user device, of an indication of the ranked plurality of candidate content entities that are responsive to the second query.

* * * * *